(12) United States Patent
Yu et al.

(10) Patent No.: US 11,474,850 B2
(45) Date of Patent: Oct. 18, 2022

(54) METHOD AND SYSTEM FOR EFFICIENT VIRTUAL MACHINE OPERATION WHILE RECOVERING DATA

(71) Applicant: EMC IP Holding Company LLC, Hopkinton, MA (US)

(72) Inventors: Jing Yu, Shanghai (CN); Ming Zhang, Shanghai (CN); Ren Wang, Shanghai (CN); Weiyang Liu, Shanghai (CN); Scott Randolph Quesnelle, Ontario (CA); Mengze Liao, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 309 days.

(21) Appl. No.: 16/804,085

(22) Filed: Feb. 28, 2020

(65) Prior Publication Data

US 2021/0271504 A1    Sep. 2, 2021

(51) Int. Cl.
*G06F 9/455* (2018.01)
*G06F 11/14* (2006.01)
*G06F 3/06* (2006.01)

(52) U.S. Cl.
CPC .......... *G06F 9/45558* (2013.01); *G06F 3/061* (2013.01); *G06F 3/064* (2013.01); *G06F 3/0664* (2013.01); *G06F 11/1448* (2013.01); *G06F 2009/4557* (2013.01); *G06F 2009/45579* (2013.01); *G06F 2009/45583* (2013.01); *G06F 2201/815* (2013.01)

(58) Field of Classification Search
CPC ...... G06F 9/45558; G06F 3/061; G06F 3/064; G06F 3/0664; G06F 11/1448; G06F 2009/4557; G06F 2009/45579; G06F 2009/45583; G06F 2201/815; G06F 11/1469; G06F 11/1451
USPC .......................................................... 718/1
See application file for complete search history.

(56) References Cited

U.S. PATENT DOCUMENTS

| | | | |
|---|---|---|---|
| 9,354,907 B1 * | 5/2016 | Teli ..................... | G06F 12/109 |
| 9,547,562 B1 * | 1/2017 | Feathergill .......... | G06F 11/1458 |
| 9,996,429 B1 * | 6/2018 | Kumar ................ | G06F 11/1448 |
| 2018/0143880 A1 * | 5/2018 | Dornemann ........ | G06F 11/2048 |
| 2018/0276083 A1 * | 9/2018 | Mitkar ................ | G06F 11/3006 |
| 2018/0329636 A1 * | 11/2018 | Dornemann ............ | G06F 11/00 |
| 2019/0340078 A1 * | 11/2019 | Bangalore ........... | G06F 11/1451 |
| 2020/0034252 A1 * | 1/2020 | Mitkar ................ | G06F 11/3034 |
| 2021/0011754 A1 * | 1/2021 | Dornemann ............ | G06F 3/065 |

* cited by examiner

*Primary Examiner* — Kenneth Tang
(74) *Attorney, Agent, or Firm* — Chamberlain, Hrdlicka, White, Williams & Aughtry (57) ABSTRACT

A method and system for efficient virtual machine operation while recovering data. Specifically, the disclosed method and system enable the activation of virtual machines while virtual machine data, pertinent to the virtual machines, may concurrently be undergoing restoration. By activation, virtual machines may be permitted to issue input-output operations targeting their respective virtual machine data. Further, whether or not the sought virtual machine data has been recovered, fulfillment of the input-output operations may entail accessing virtual machine data either stored locally or retained remotely on a backup storage service.

20 Claims, 7 Drawing Sheets

METHOD AND SYSTEM FOR EFFICIENT VIRTUAL MACHINE OPERATION WHILE RECOVERING DATA

BACKGROUND

Current technologies directed to virtual machine data recovery restricts virtual machine access to their respective virtual machine data only following the complete restoration of the virtual machine data.

SUMMARY

In general, in one aspect, the invention relates to a method for processing read requests. The method includes, while concurrently recovering virtual machine data pertinent to a virtual machine, receiving, from the virtual machine, a first read request including a first virtual disk block address, obtaining a first block bitmap state using the first virtual disk block address, reading, based on the first block bitmap state, first virtual machine data stored remotely on a backup storage service at the first virtual disk block address, and providing, in response to the first read request, the first virtual machine data to the virtual machine.

In general, in one aspect, the invention relates to a non-transitory computer readable medium (CRM). The non-transitory CRM includes computer readable program code, which when executed by a computer processor, enables the computer processor to, while concurrently recovering virtual machine data pertinent to a virtual machine, receive, from the virtual machine, a first read request including a first virtual disk block address, obtain a first block bitmap state using the first virtual disk block address, read, based on the first block bitmap state, first virtual machine data stored remotely on a backup storage service at the first virtual disk block address, and provide, in response to the first read request, the first virtual machine data to the virtual machine.

In general, in one aspect, the invention relates to a system. The system includes a plurality of client devices, and a backup storage service operatively connected to the plurality of client devices, wherein a client device of the plurality of client devices includes a computer processor programmed to, while concurrently recovering virtual machine data pertinent to a virtual machine, receive, from the virtual machine, a read request including a virtual disk block address, obtain a block bitmap state using the virtual disk block address, read, based on the block bitmap state, first virtual machine data stored remotely on the backup storage service at the virtual disk block address, and provide, in response to the read request, the first virtual machine data to the virtual machine.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-3, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for efficient virtual machine operation while recovering data. Specifically, one or more embodiments of the invention enables the activation of virtual machines while virtual machine data, pertinent to the virtual machines, may concurrently be undergoing restoration. By activation, virtual machines may be permitted to issue input-output operations targeting their respective virtual machine data. Further, whether or not the sought virtual machine data has been recovered, fulfillment of the input-output operations may entail accessing virtual machine data either stored locally or retained remotely on a backup storage service.

Figure 1A:
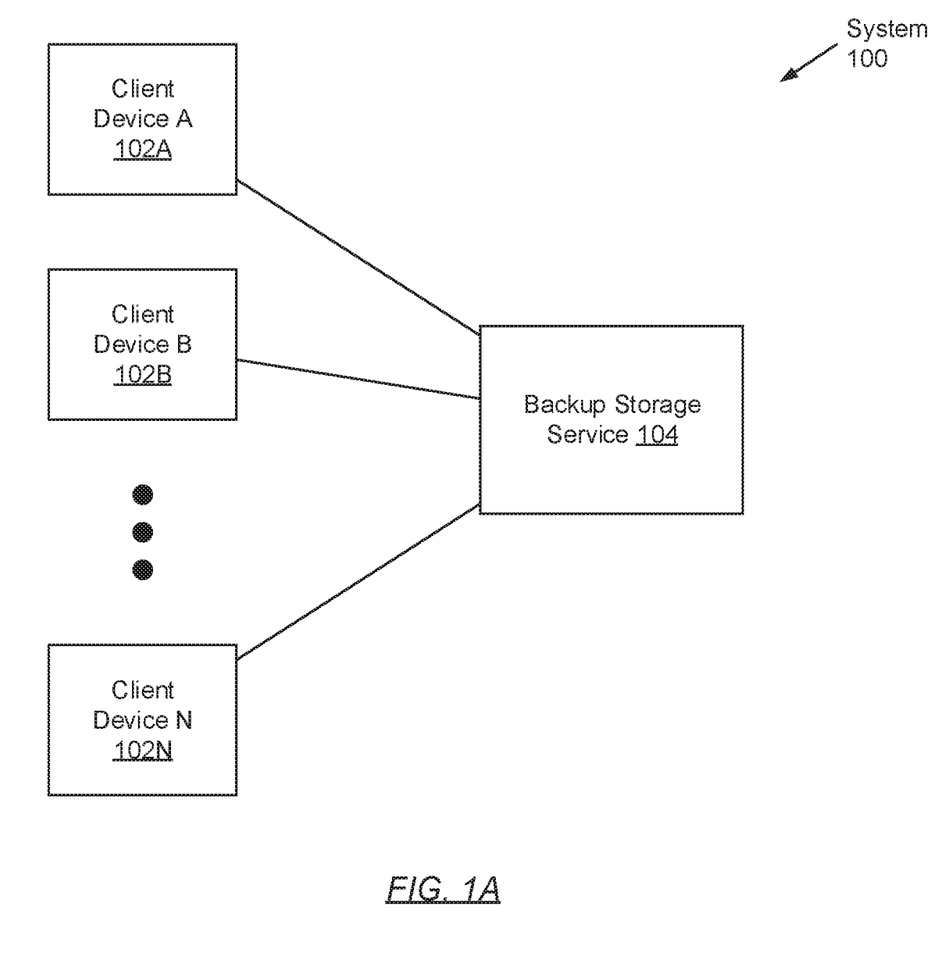
FIG. 1A shows a system in accordance with one or more embodiments of the invention.

FIG. 1A shows a system in accordance with one or more embodiments of the invention. The system (100) may include one or more client devices (102A-102N) operatively connected to a backup storage service (104). Each of these system (100) components is described below.

In one embodiment of the invention, the above-mentioned system (100) components may operatively connect to one another through a network (not shown) (e.g., a local area network (LAN), a wide area network (WAN) such as the Internet, a mobile network, etc.). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, a client device (102A-102N) may represent any physical appliance or computing system designed and configured to receive, generate, process, store, and/or transmit digital data, as well as to provide an environment in which one or more computer programs may execute thereon. The aforementioned computer programs may, for example, implement large-scale and complex data processing; or implement one or more services offered locally or over the network. Further, in providing an execution environment for any computer programs installed thereon, a client device (102A-102N) may include and allocate various resources (e.g., computer processors, memory, storage, virtualization, network bandwidth, etc.), as needed, to the computer programs and the tasks (or processes) instantiated thereby. One of ordinary skill will appreciate that a client device (102A-102N) may perform other functionalities without departing from the scope of the invention. Examples of a client device (102A-102N) may include, but are not limited to, a desktop computer, a laptop computer, a server, a mainframe, or any other computing system similar to the exemplary computing system shown in FIG. 3. Moreover, client devices (102A-102N) are described in further detail below with respect to FIG. 1B.

In one embodiment of the invention, the backup storage service (104) may represent a data backup, archiving, and/or disaster recovery storage system. The backup storage service (104) may be implemented using one or more servers (not shown). Each server may refer to a physical or virtual server, which may reside in a datacenter or a cloud computing environment. Additionally or alternatively, the backup storage service (104) may be implemented using one or more computing systems similar to the exemplary computing system shown in FIG. 3. Furthermore, the backup storage service (104) is described in further detail below with respect to FIG. 1C.

While FIG. 1A shows a configuration of components, other system (100) configurations may be used without departing from the scope of the invention.

Figure 1B:
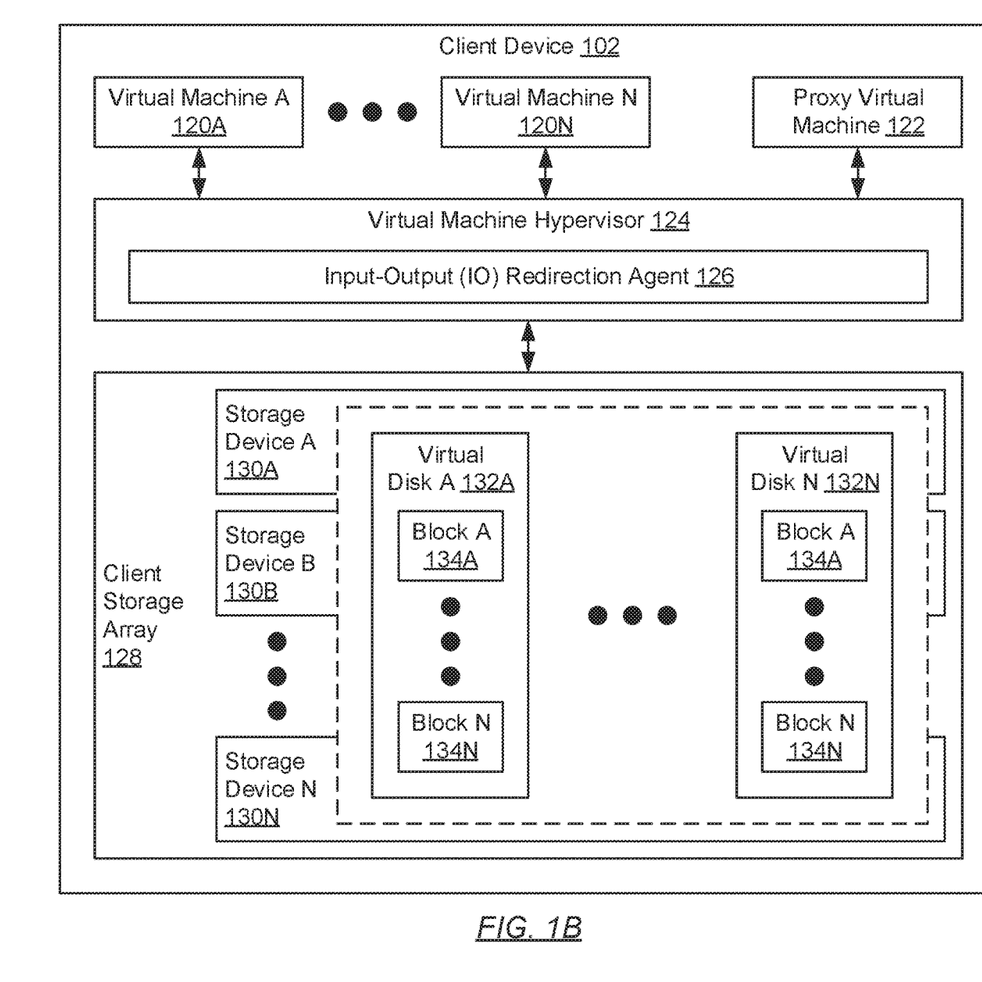
FIG. 1B shows a client device in accordance with one or more embodiments of the invention.

FIG. 1B shows a client device in accordance with one or more embodiments of the invention. The client device (102) may include one or more virtual machines (120A-120N), a proxy virtual machine (122), a virtual machine hypervisor (124), and a client storage array (128). Each of these client device (102) subcomponents is described below.

In one embodiment of the invention, a virtual machine (120A-120N) may represent a computer program that executes on the underlying hardware of the client device (102). Further, a virtual machine (120A-120N) may represent a computer program that emulates a physical computing system and, thus, provides a self-contained execution environment on which one or more other computer programs (e.g., guest operating systems (OSs) and/or applications) may execute. In addition, a virtual machine (120A-120N) may access the underlying client device (102) hardware and interact with other client device (102) subcomponents using an abstraction layer—i.e., the virtual machine hypervisor (124) (described below). Moreover, a virtual machine (120A-120N) may include functionality to submit virtual disk input-output (IO) operations directed to reading data from and writing data to a corresponding virtual disk (132A-132N) residing on the client storage array (128). One of ordinary skill will appreciate that a virtual machine (120A-120N) may perform other functionalities without departing from the scope of the invention.

In one embodiment of the invention, the proxy virtual machine (122) may represent a specialized virtual machine, or computer program, that executes on the underlying hardware of the client device (102). Particularly, the proxy virtual machine (122) may facilitate interactivity between the IO redirection agent (126) and the backup storage service (104). To that extent, the proxy virtual machine (122) may include functionality to perform various steps (as indicated) in the flowcharts illustrated in FIGS. 2A-2C, which may be directed to a method for efficient virtual machine operation while recovering data. One of ordinary skill will appreciate that the proxy virtual machine may perform other functionalities without departing from the scope of the invention.

In one embodiment of the invention, the virtual machine hypervisor (124) may represent a computer program that executes on the underlying hardware of the client device (102). Specifically, the virtual machine hypervisor (124) may be a computer program tasked with the management of one or more virtual machines (120A-120N) and the proxy virtual machine (122). To that extent, the virtual machine hypervisor (124) may include functionality to: create and delete virtual machines (120A-120N); allocate or deallocate client (102) resources to support the operation of the virtual machines (120A-120N) and the proxy virtual machine (122); and enable, as well as manage, intra-host communication between the virtual machines (120A-120N), the proxy virtual machine (122), and the client storage array (128). One of ordinary skill will appreciate that the virtual machine hypervisor (124) may perform other functionalities without departing from the scope of the invention.

In one embodiment of the invention, the virtual machine hypervisor (124) may include an input-output (IO) redirection agent (126). The IO redirection agent (1260 may represent a process (i.e., an instance of a computer program) that may execute on the underlying hardware of the client device (102), which may serve to retrieve virtual machine data—sought by virtual machines (120A-120N)—from an appropriate source—i.e., a virtual disk (132A-132N) or the backup storage service (104). Identification of the aforementioned appropriate source may be determined through lookups performed on a block bitmap (not shown) maintained by the IO redirection agent (126). The block bitmap may refer to a data structure (e.g., a data table) that tracks which virtual disk blocks (134A-134N) of one or more virtual disks (132A-132N) contain recovered or written virtual machine data. A state of each virtual disk block (134A-134N), as maintained in the block bitmap, may be indexed by way of a virtual disk block address referencing the virtual disk block (134A-134N). Further, the block bitmap may reflect a current block bitmap state maintained for each given virtual disk block address. The block bitmap state may be expressed as a binary value, where the one or set state may indicate that the virtual machine block (134A-134N) at the virtual machine block address contains virtual machine data, whereas the zero or clear state may alternatively indicate that the virtual machine block (134A-134N) at the virtual machine block address does not contain any virtual machine data.

In one embodiment of the invention, the client storage array (128) may refer to a collection of one or more physical storage devices (130A-130N) on which various forms of digital data—e.g., one or more virtual disks (132A-132N) (described below)—may be consolidated. Each physical storage device (130A-130N) may encompass non-transitory computer readable storage media on which data may be stored in whole or in part, and temporarily or permanently. Further, each physical storage device (130A-130N) may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the client storage array (128) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the client storage array (128) may store one or more virtual disks (132A-132N). A virtual disk (132A-132N) may represent a logical container, a data object, or a data structure dedicated to storing virtual machine state (also referred to as virtual machine data) and associated metadata. Further, each virtual machine (120A-120N), on the client device (102), may map to and access virtual machine data stored in one or more virtual disks (132A-132N). Also, each virtual disk (132A-132N) may span across one or more physical storage devices (130A-130N) and/or media that implement, at least in part, the client storage array (128). Moreover, a virtual disk (132A-132N) may be segmented into multiple virtual disk blocks (134A-134N). Each virtual disk block (134A-134N) may refer to a contiguous sequence of bytes or bits representing a prescribed size (i.e., a block size) of storage space, which may be referenced by a physical or logical virtual disk block address.

While FIG. 1B shows a configuration of subcomponents, other client device (102) configurations may be used without departing from the scope of the invention.

Figure 1C:
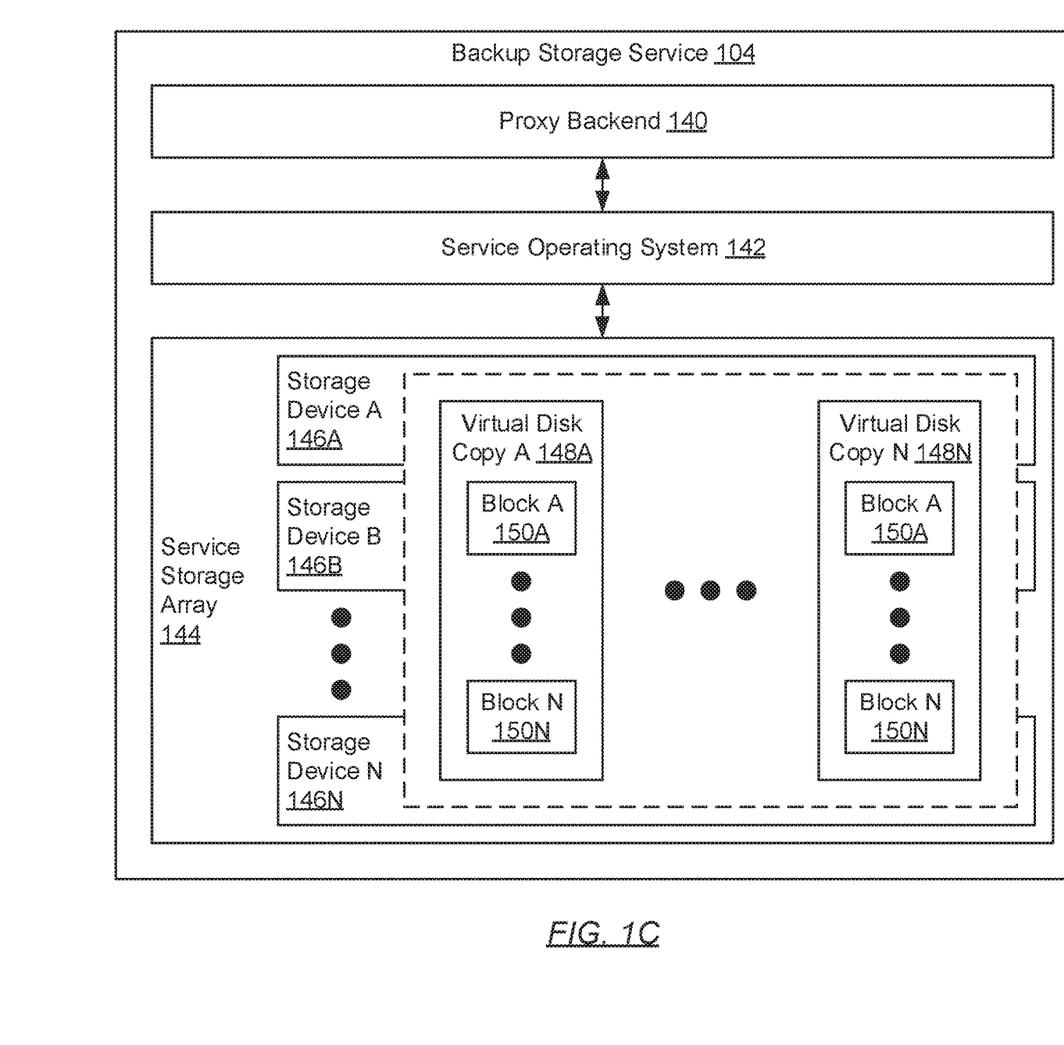
FIG. 1C shows a backup storage service in accordance with one or more embodiments of the invention.

FIG. 1C shows a backup storage service in accordance with one or more embodiments of the invention. The backup storage service (104) may include a proxy backend (140), a service operating system (142), and a service storage array (144). Each of these backup storage service (104) subcomponents is described below.

In one embodiment of the invention, the proxy backend (140) may represent a computer program that may execute on the underlying hardware of the backup storage service (104). Particularly, the proxy backend (140) may serve as a counterpart to a proxy virtual machine (122) residing on a client device (102A-102N). To that extent, the proxy backend (140) may include functionality to: receive virtual machine data retrieval requests, which may specify virtual disk block addresses; read virtual machine data stored in virtual disk blocks (150A-150N) referenced by the specified virtual disk block addresses; and transmit, over a network, the read virtual machine data to the requesting proxy virtual machine (122) on a client device (102A-102N). One of ordinary skill will appreciate that the proxy backend (140) may perform other functionalities without departing from the scope of the invention.

In one embodiment of the invention, the service operating system (142) may refer to a computer program that may execute on the underlying hardware of the backup storage service (104). Specifically, the service operating system (142) may be designed and configured to oversee backup storage service (104) operations. To that extent, the service operating system (142) may include functionality to, for example, support fundamental backup storage service (104) functions; schedule tasks; mediate interactivity between logical (e.g., software) and physical (e.g., hardware) backup storage service (104) components; allocate backup storage service (104) resources; and execute or invoke other computer programs executing on the backup storage service (104). One of ordinary skill will appreciate that the service operating system (142) may perform other functionalities without departing from the scope of the invention.

In one embodiment of the invention, the service storage array (144) may refer to a collection of one or more physical storage devices (146A-146N) on which various forms of digital data—e.g., one or more virtual disk copies (148A-148N) (described below)—may be consolidated. Each physical storage device (146A-1460N) may encompass non-transitory computer readable storage media on which data may be stored in whole or in part, and temporarily or permanently. Further, each physical storage device (146A-146N) may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the service storage array (144) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the service storage array (144) may store one or more virtual disk copies (148A-148N). A virtual disk copy (148A-148N) may represent a logical container, a data object, or a data structure dedicated to storing replica virtual machine state (also referred to as replica virtual machine data) and associated replica metadata. Further, each virtual disk copy (148A-148N) may span across one or more physical storage devices (146A-146N) and/or media that implement, at least in part, the service storage array (144). Moreover, a virtual disk copy (148A-148N) may be segmented into multiple virtual disk copy blocks (150A-150N). Each virtual disk copy block (150A-150N) may refer to a contiguous sequence of bytes or bits representing a prescribed size (i.e., a block size) of storage space, which may be referenced by a physical or logical virtual disk copy block address.

While FIG. 1C shows a configuration of subcomponents, other backup storage service (104) configurations may be used without departing from the scope of the invention.

Figure 2A:
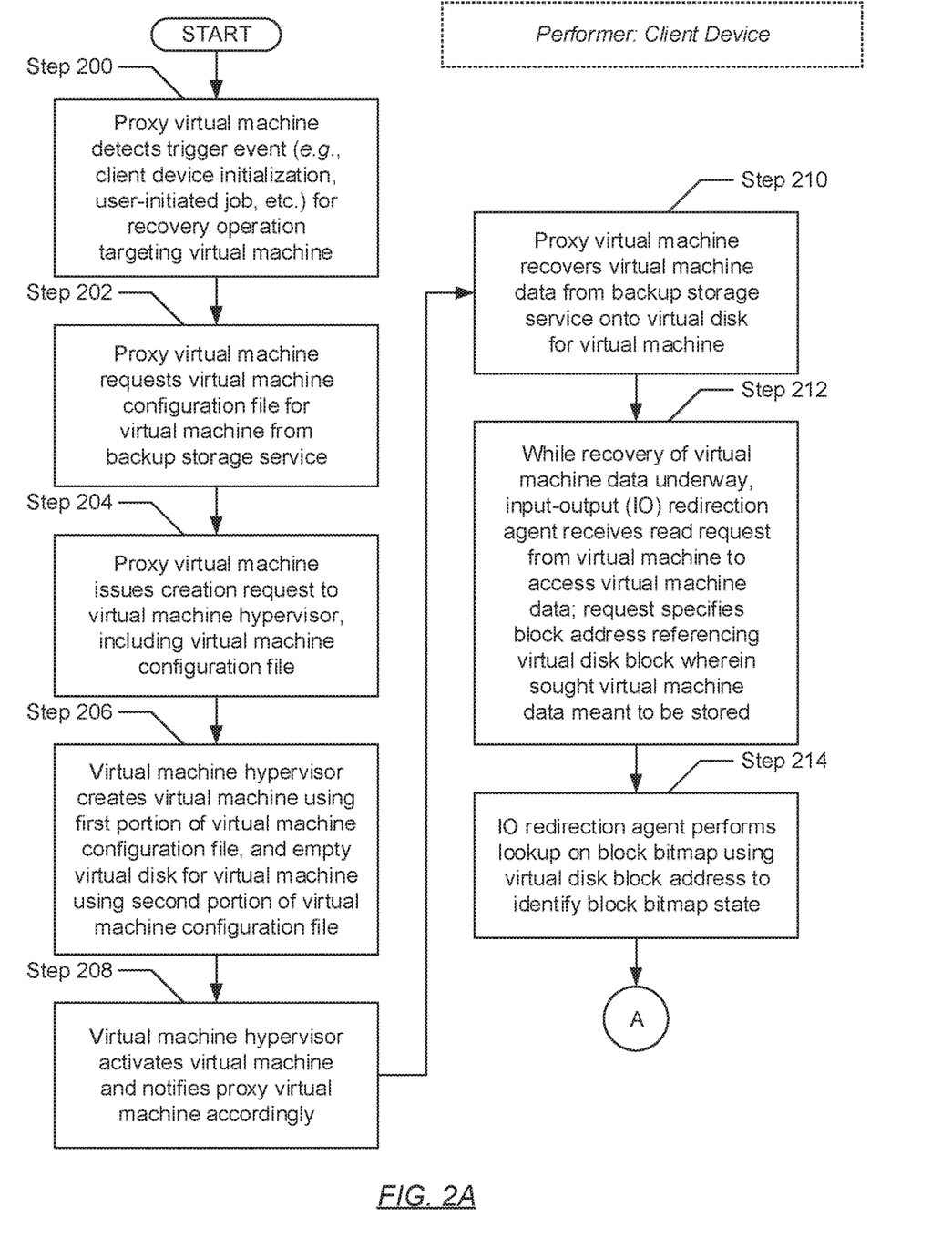
FIGS. 2A-2C show flowcharts describing a method for efficient virtual machine operation while recovering data in accordance with one or more embodiments of the invention.
Figure 2B:
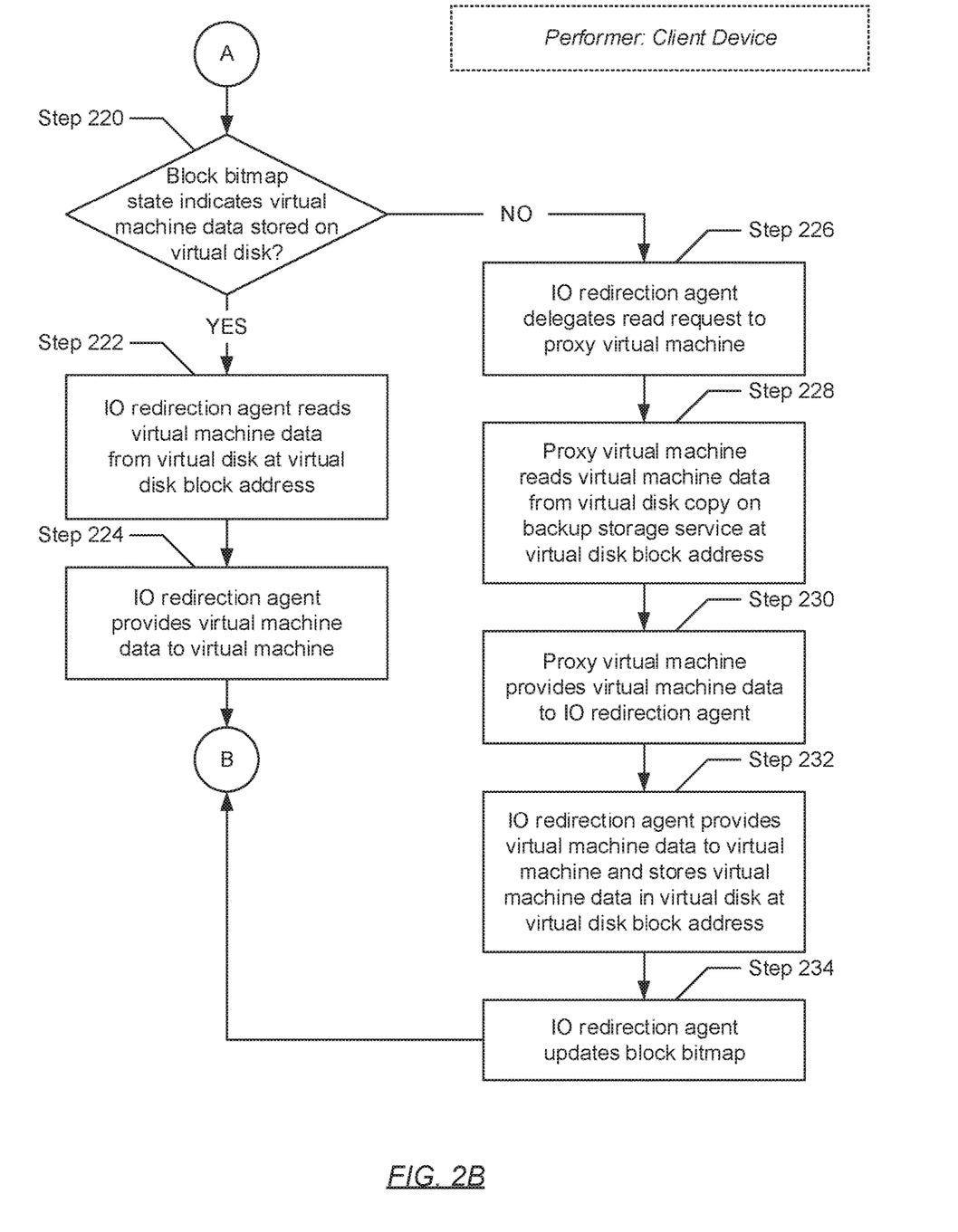
Figure 2C:
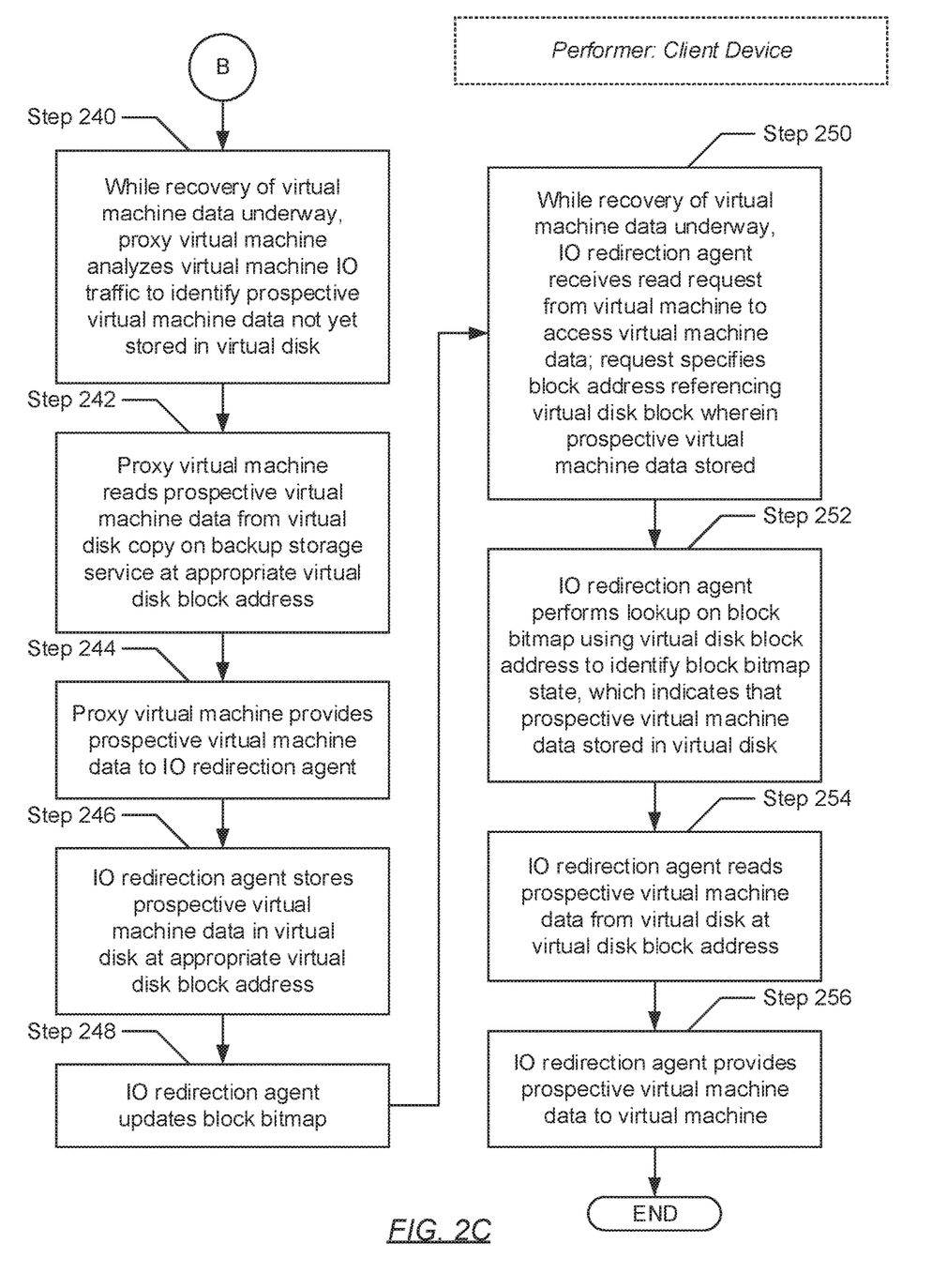

FIGS. 2A-2C show flowcharts describing a method for efficient virtual machine operation while recovering data in accordance with one or more embodiments of the invention. The various steps outlined below may be performed by the proxy virtual machine, virtual machine hypervisor, or the input-output (IO) redirection agent executing on any client device (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel.

Turning to FIG. 2A, in Step 200, the proxy virtual machine detects a trigger event. In one embodiment of the invention, the trigger event may pertain to a recovery operation targeting a virtual machine that had once operated (or operated properly) on the client device. Further, the trigger event may, for example, take the form of a client device initialization or a user-instantiated job.

In Step 202, the proxy virtual machine requests a virtual machine configuration file from the backup storage service. In one embodiment of the invention, the virtual machine configuration file may be associated with the above-mentioned virtual machine. Further, the virtual machine configuration file may include parameter values for various configuration parameters, which may be used in the definition and creation of the virtual machine, as well as any virtual disks (see e.g., FIG. 1B) linked to the virtual machine. Examples of these configuration parameters may include, but are not limited to, a virtual machine name assigned to the virtual machine, a memory capacity allocated to the virtual machine, a virtual disk name or identifier assigned to the virtual disk associated with the virtual machine, etc.

In Step 204, the proxy virtual machine issues a creation request to the virtual machine hypervisor. In one embodiment of the invention, the creation request may pertain to creating the virtual machine on the client device. Further, the creation request may include the virtual machine configuration file (obtained in Step 202).

In Step 206, in response to the creation request (issued in Step 204), the virtual machine hypervisor creates the virtual machine and a virtual disk for the virtual machine on the client device. Specifically, in one embodiment of the invention, the virtual machine may be created based on a first portion of configuration parameters specified in the virtual machine configuration file, whereas the virtual disk may be created based on a second portion of configuration parameters specified in the virtual machine configuration file. Further, the virtual disk may be initialized to an empty state, which may store no virtual machine state (or data) therein.

In Step 208, following the creation of the virtual machine and virtual disk (in Step 206), the virtual machine hypervisor activates the virtual machine. In one embodiment of the invention, activation of the virtual machine may permit the virtual machine to issue input-output (TO) operations (e.g., write and/or read requests) for the storage and/or retrieval of virtual machine data maintained on the virtual disk. Thereafter, the virtual machine hypervisor may notify the proxy virtual machine of the completed creation of the virtual machine and the virtual disk, as well as the subsequent activation of the former.

In Step 210, the proxy virtual machine recovers virtual machine data (or more specifically, replica virtual machine data) from the backup storage service. In one embodiment of the invention, the recovery process may entail the retrieval of virtual machine data one disk block at a time. After obtaining each disk block, the proxy virtual machine may provide the disk block of virtual machine data to the IO redirection agent, which may subsequently store the disk block onto the virtual disk (created in Step 206) at an appropriate disk block address. The IO redirection agent may further update a block bitmap used to track which disk blocks (at which block addresses) contain recovered or written virtual machine data.

In Step 212, while recovery of the virtual machine data (initiated in Step 210) is underway, the IO redirection agent receives a read request from the virtual machine (activated in Step 208). In one embodiment of the invention, the read request may specify a virtual disk block address referencing a virtual disk block of the virtual disk (created in Step 206).

In Step 214, in response to receiving the read request, the IO redirection agent performs a lookup on a block bitmap using the virtual disk block address (received in Step 212). In one embodiment of the invention, the block bitmap may refer to a data structure (e.g., a data table) that tracks which virtual disk blocks of the virtual disk contain recovered or written virtual machine data. A state of each virtual disk block, as maintained in the block bitmap, may be indexed by way of the virtual disk block address referencing the virtual disk block. Further, following the aforementioned lookup, the IO redirection agent identifies a block bitmap state maintained for the virtual disk block address. The block bitmap state may be expressed as a binary value, where the one or set state may indicate that the virtual machine block at the virtual machine block address contains virtual machine data, whereas the zero or clear state may alternatively indicate that the virtual machine block at the virtual machine block address does not contain any virtual machine data.

Turning to FIG. 2B, in Step 220, a determination is made as to whether block bitmap state (identified in Step 214) is indicative that the virtual machine block at the virtual machine block address (received in Step 212) contains virtual machine data. In one embodiment of the invention, if it is determined that virtual machine data is stored in the aforementioned virtual machine block based on the block bitmap state, then the process proceeds to Step 222. On the other hand, in another embodiment of the invention, if it is alternatively determined that virtual machine data is not stored in the aforementioned virtual machine block based on the block bitmap state, then the process alternatively proceeds to Step 226.

In Step 222, upon determining (in Step 220) that the above-mentioned virtual machine block, at the virtual machine block address (received in Step 212), contains virtual machine data, the IO redirection agent reads the stored virtual machine data maintained in the virtual machine block. Thereafter, in Step 224, the IO redirection agent provides the stored virtual machine data (read in Step 222) to the virtual machine. From here, the process proceeds to Step 240 (see e.g., FIG. 2C).

In Step 226, upon alternatively determining (in Step 220) that the above-mentioned virtual machine block, at the virtual machine block address (received in Step 212), does not contain virtual machine data, the IO redirection agent delegates the read request (received in Step 212) to the proxy virtual machine. In turn, in Step 228, the proxy virtual machine reads virtual machine data (or more specifically, replica virtual machine data) from a replica virtual disk, residing on the backup storage service, for the virtual machine.

In Step 230, the proxy virtual machine provides the virtual machine data (read from the backup storage service in Step 228) to the IO redirection agent. Subsequently, in Step 232, the IO redirection agent provides the virtual machine data to the virtual machine in response to the read request (received therefrom in Step 212). The IO redirection agent may further store the virtual machine data in the virtual disk (created in Step 206) at the virtual machine block address received by way of the read request. Furthermore, in Step 234, the IO redirection agent updates the block bitmap such that the block bitmap state, corresponding to the virtual machine block address, reflects that the virtual disk block referenced by the virtual machine block address contains virtual machine data.

Turning to FIG. 2C, in Step 240, while recovery of the virtual machine data (initiated in Step 210) is underway, the proxy virtual machine analyzes historical IO patterns exhibited by the virtual machine (activated in Step 208). In one embodiment of the invention, the analysis may result in the identification of prospective virtual machine data not yet stored in the virtual disk. The prospective virtual machine data, however, may refer to a prediction on which virtual machine data that the virtual machine may request access to next.

In Step 242, the proxy virtual machine reads the prospective virtual machine data (identified in Step 240) from the backup storage service. More specifically, in one embodiment of the invention, the prospective virtual machine data may be read from a virtual disk copy respective to the virtual machine, and at an appropriate virtual machine block address, which may also be identified through analysis (performed in Step 240).

In Step 244, the proxy virtual machine subsequently provides the prospective virtual machine data (read from the backup storage service in Step 242) to the IO redirection agent. Thereafter, in Step 246, the IO redirection agent stores the prospective virtual machine data in the virtual disk (created in Step 206) at the above-mentioned appropriate virtual machine block address. Next, in Step 248, the IO redirection agent updates the block bitmap such that the block bitmap state, corresponding to the appropriate virtual machine block address, reflects that the virtual disk block referenced by the virtual machine block address contains virtual machine data.

In Step 250, while recovery of the virtual machine data (initiated in Step 210) is underway, the IO redirection agent receives a read request from the virtual machine (activated in Step 208). In one embodiment of the invention, the read request may specify a virtual disk block address referencing the virtual disk block of the virtual disk (created in Step 206) wherein the prospective virtual machine data had been stored (in Step 246).

In Step 252, in response to receiving the read request, the IO redirection agent performs a lookup on the block bitmap (described above) using the virtual disk block address (received in Step 250). In one embodiment of the invention, following the aforementioned lookup, the IO redirection agent identifies the block bitmap state maintained for the virtual disk block address, where because the prospective virtual machine data had been stored thereat (in Step 246), reflects a one or set state.

Accordingly, in Step 254, based on the block bitmap state (identified in Step 252), the IO redirection agent reads the stored prospective virtual machine data maintained in the virtual machine block. Thereafter, in Step 256, the IO redirection agent provides the stored virtual machine data (read in Step 254) to the virtual machine in response to the read request (received therefrom in Step 250).

Figure 3:
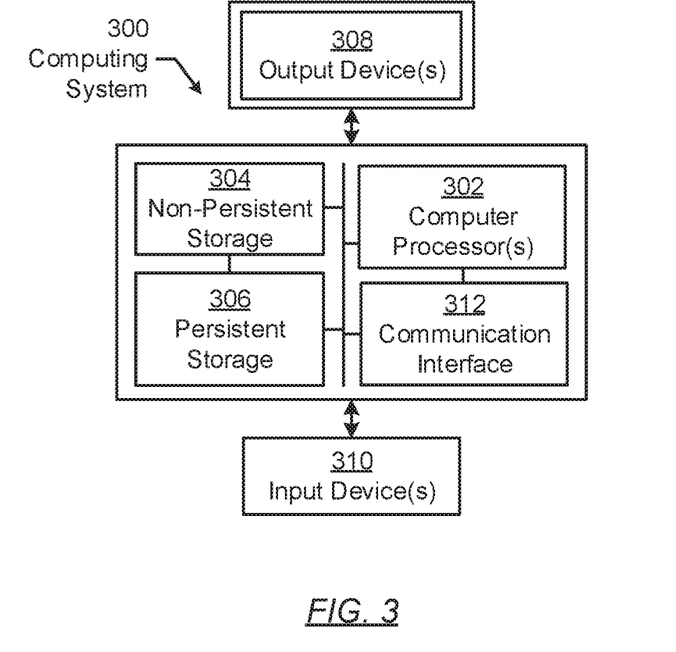
FIG. 3 shows an exemplary computing system in accordance with one or more embodiments of the invention.

FIG. 3 shows an exemplary computing system in accordance with one or more embodiments of the invention. The computing system (300) may include one or more computer processors (302), non-persistent storage (404) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one embodiment of the invention, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing read requests, comprising:
   while concurrently recovering virtual machine data pertinent to a virtual machine:
   receiving, from the virtual machine, a first read request comprising a first virtual disk block address;
   obtaining, from a block bitmap, a first block bitmap state using the first virtual disk block address;
   reading, based on the first block bitmap state, first virtual machine data stored remotely on a backup storage service at the first virtual disk block address;
   providing, in response to the first read request, the first virtual machine data to the virtual machine;
   performing an analysis on historical input-output (IO) patterns exhibited by the virtual machine to identify a second virtual disk block address;
   reading second virtual machine data stored remotely on the backup storage service at the second virtual disk block address; and
   storing the second virtual machine data locally in a virtual disk at the second virtual disk block address.

2. The method of claim 1, wherein the first block bitmap state reflects a first value indicative that a virtual disk block of the virtual disk is empty.

3. The method of claim 2, wherein the first virtual disk block address references the virtual disk block, wherein the virtual disk is locally accessible.

4. The method of claim 2, further comprising:
prior to performing the analysis on historical IO patterns exhibited by the virtual machine:
storing the first virtual machine data locally in the virtual disk at the first virtual disk block address; and
updating the block bitmap to replace the first block bitmap state with a new first block bitmap state,
wherein the virtual disk is associated with the virtual machine.

5. The method of claim 4, wherein the new first block bitmap state reflects a second value indicative that the virtual disk block of the virtual disk is non-empty.

6. The method of claim 1, further comprising:
receiving, from the virtual machine, a second read request comprising a third virtual disk block address;
obtaining, from the block bitmap, a third block bitmap state using the third virtual disk block address;
reading, based on the third block bitmap state, third virtual machine data stored locally on the virtual disk at the second virtual disk block address; and
providing, in response to the second read request, the third virtual machine data to the virtual machine.

7. The method of claim 6, wherein the third block bitmap state reflects a value indicative that a virtual disk block of the virtual disk is non-empty.

8. The method of claim 1, further comprising:
updating the block bitmap to replace a second block bitmap state with a new second block bitmap state,
wherein the second and new second block bitmap states are mapped to the second virtual disk block address in the block bitmap.

9. The method of claim 8, wherein the second virtual machine data represents prospective virtual machine data predicted to be sought next by the virtual machine.

10. A non-transitory computer readable medium (CRM) comprising computer readable program code, which when executed by a computer processor, enables the computer processor to:
while concurrently recovering virtual machine data pertinent to a virtual machine:
receive, from the virtual machine, a first read request comprising a first virtual disk block address;
obtain, from a block bitmap, a first block bitmap state using the first virtual disk block address;
read, based on the first block bitmap state, first virtual machine data stored remotely on a backup storage service at the first virtual disk block address;
provide, in response to the first read request, the first virtual machine data to the virtual machine;
perform an analysis on historical input-output (IO) patterns exhibited by the virtual machine to identify a second virtual disk block address;
read second virtual machine data stored remotely on the backup storage service at the second virtual disk block address; and
store the second virtual machine data locally in a virtual disk at the second virtual disk block address.

11. The non-transitory CRM of claim 10, wherein the first block bitmap state reflects a first value indicative that a virtual disk block of the virtual disk is empty.

12. The non-transitory CRM of claim 11, wherein the first virtual disk block address references the virtual disk block, wherein the virtual disk is locally accessible.

13. The non-transitory CRM of claim 11, comprising computer readable program code, which when executed by the computer processor, further enables the computer processor to:
prior to performing the analysis on historical TO patterns exhibited by the virtual machine:
store the first virtual machine data locally in the virtual disk at the first virtual disk block address; and
update the block bitmap to replace the first block bitmap state with a new first block bitmap state,
wherein the virtual disk is associated with the virtual machine.

14. The non-transitory CRM of claim 13, wherein the new first block bitmap state reflects a second value indicative that the virtual disk block of the virtual disk is non-empty.

15. The non-transitory CRM of claim 10, comprising computer readable program code, which when executed by the computer processor, further enables the computer processor to:
receive, from the virtual machine, a third read request comprising a third virtual disk block address;
obtain, from the block bitmap, a third block bitmap state using the third virtual disk block address;
read, based on the third block bitmap state, third virtual machine data stored locally on the virtual disk at the third virtual disk block address; and
provide, in response to the second read request, the third virtual machine data to the virtual machine.

16. The non-transitory CRM of claim 15, wherein the second block bitmap state reflects a value indicative that a virtual disk block of the virtual disk is non-empty.

17. The non-transitory CRM of claim 10, comprising computer readable program code, which when executed by the computer processor, further enables the computer processor to:
update the block bitmap to replace a second block bitmap state with a new second block bitmap state,
wherein the second and new second block bitmap states are mapped to the second virtual disk block address in the block bitmap.

18. The non-transitory CRM of claim 17, wherein the second virtual machine data represents prospective virtual machine data predicted to be sought next by the virtual machine.

19. A system, comprising:
a plurality of client devices; and
a backup storage service operatively connected to the plurality of client devices,
wherein a client device of the plurality of client devices comprises a computer processor programmed to:
while concurrently recovering virtual machine data pertinent to a virtual machine:
receive, from the virtual machine, a read request comprising a virtual disk block address;
obtain, from a block bitmap, a block bitmap state using the virtual disk block address;
read, based on the block bitmap state, first virtual machine data stored remotely on the backup storage service at the virtual disk block address; and
provide, in response to the read request, the first virtual machine data to the virtual machine;
perform an analysis on historical input-output (TO) patterns exhibited by the virtual machine to identify a second virtual disk block address;
read second virtual machine data stored remotely on the backup storage service at the second virtual disk block address; and store the second virtual machine data locally in a virtual disk at the second virtual disk block address.

20. The system of claim 19, wherein the virtual machine executes on the client device.

* * * * *